(12) United States Patent
Menzel (10) Patent No.: US 10,274,912 B2
(45) Date of Patent: Apr. 30, 2019

(54) INDEPENDENT AUTOMATION TECHNOLOGY FIELD DEVICE FOR REMOTE MONITORING

(71) Applicant: SIEMENS AKTIENGESELLSCHAFT, München (DE)

(72) Inventor: Thomas Menzel, Lagensendelbach OT Bräuningshof (DE)

(73) Assignee: Siemens Aktiegensellschaft, Munich (DE)

( * ) Notice: Subject to any disclaimer, the term of this patent is extended or adjusted under 35 U.S.C. 154(b) by 297 days.

(21) Appl. No.: 15/040,675

(22) Filed: Feb. 10, 2016

(65) Prior Publication Data

US 2016/0231719 A1    Aug. 11, 2016

(30) Foreign Application Priority Data

Feb. 11, 2015  (EP) .................................... 15154671

(51) Int. Cl.

| | |
|---|---|
| *G05B 15/02* | (2006.01) |
| *G06F 13/42* | (2006.01) |
| *G06F 13/38* | (2006.01) |
| *G06F 13/12* | (2006.01) |
| *G06F 11/30* | (2006.01) |
| *G05B 19/042* | (2006.01) |

(52) U.S. Cl.
CPC ............ *G05B 15/02* (2013.01); *G05B 19/042* (2013.01); *G06F 11/3058* (2013.01); *G06F 11/3089* (2013.01); *G06F 13/126* (2013.01); *G06F 13/385* (2013.01); *G06F 13/4282* (2013.01)

(58) Field of Classification Search
CPC ................................ G05B 15/02; G06F 3/165
USPC ..................................................... 700/275, 94
See application file for complete search history.

(56) References Cited

U.S. PATENT DOCUMENTS 4,029,913 A  *  6/1977  Gunderson .............. H04B 3/46
                                                   370/248
4,890,081 A  *  12/1989  McKee ................ H01H 71/125
                                                   335/132

(Continued)

FOREIGN PATENT DOCUMENTS

| CN | 1371487 A | 9/2002 |
|---|---|---|
| CN | 1027685/2 A | 5/2006 |

(Continued)

*Primary Examiner* — Michael T Tran
(74) *Attorney, Agent, or Firm* — Henry M. Feiereisen LLC (57) ABSTRACT

A method and field device for monitoring automation technology is disclosed The automation field device has internal sensor apparatus that detects states that the field device is subjected as a whole, connections feeding sensor signals to the field device from external sensor apparatus, a channel to a serial field bus, and a further channel. The field device has a processor and a program stored in a memory. The processor receives signals through the field bus from the internal sensor apparatus and/or through connections to the external sensor apparatus and/or the channel to the field bus. The processor determines an evaluation result using the received signals and uses the further channel to transmit the evaluation result to a higher-order apparatus, using the program. Alternatively, the processor decides in advance whether transmission of the evaluation result is required, using the evaluation result.

19 Claims, 4 Drawing Sheets

(56) References Cited

U.S. PATENT DOCUMENTS

| | | | | |
|---|---|---|---|---|
| 4,891,617 A * | 1/1990 | Beatty, Jr. | | H01H 3/60 335/157 |
| 5,724,614 A * | 3/1998 | Garland | | G06F 13/4072 361/636 |
| 6,278,960 B1 | 8/2001 | De Groot | | |
| 6,549,127 B1 * | 4/2003 | Strackbein | | G05B 19/0428 340/506 |
| 7,318,227 B1 | 1/2008 | Hohne et al. | | |
| 7,386,359 B2 | 6/2008 | Dohle et al. | | |
| 7,421,307 B2 | 9/2008 | Dolansky et al. | | |
| 8,127,060 B2 * | 2/2012 | Doll | | G05B 19/042 700/86 |
| 8,725,081 B2 * | 5/2014 | Kantzes | | G05B 19/0423 370/310 |
| 9,300,554 B1 * | 3/2016 | Kosai | | H04L 43/08 |
| 2002/0034391 A1 * | 3/2002 | Nakano | | G03B 17/00 396/542 |
| 2002/0064011 A1 * | 5/2002 | Loechner | | G05B 19/0428 361/92 |
| 2004/0194101 A1 * | 9/2004 | Glanzer | | G05B 15/02 718/100 |
| 2006/0192671 A1 * | 8/2006 | Isenmann | | G05B 19/042 340/531 |
| 2007/0208780 A1 * | 9/2007 | Anglin | | G06F 11/1469 |
| 2007/0243830 A1 * | 10/2007 | Isenmann | | H04L 12/4625 455/67.11 |
| 2007/0250180 A1 * | 10/2007 | Bump | | G05B 19/41845 700/1 |
| 2008/0013226 A1 * | 1/2008 | Kirst | | H02H 9/008 361/18 |
| 2009/0164038 A1 | 6/2009 | Bretschneider et al. | | |
| 2009/0177970 A1 * | 7/2009 | Jahl | | G05B 19/042 715/735 |
| 2009/0210892 A1 * | 8/2009 | Ramaswamy | | G06Q 30/02 725/9 |
| 2009/0303898 A1 * | 12/2009 | Isenmann | | G05B 19/4185 370/252 |
| 2010/0077111 A1 * | 3/2010 | Holmes | | H04L 12/40013 710/33 |
| 2010/0088471 A1 * | 4/2010 | Sunaga | | G06F 15/167 711/130 |
| 2010/0185857 A1 * | 7/2010 | Neitzel | | G05B 19/0428 713/168 |
| 2011/0004685 A1 * | 1/2011 | De Groot | | G05B 19/0425 709/225 |
| 2011/0153786 A1 * | 6/2011 | Merkel | | G05B 19/4186 709/220 |
| 2011/0283027 A1 * | 11/2011 | Buesching | | H04L 12/40032 710/105 |
| 2013/0006399 A1 * | 1/2013 | Tandon | | G05B 19/0423 700/88 |
| 2013/0060351 A1 * | 3/2013 | Imming | | H04W 4/029 700/13 |
| 2013/0085719 A1 * | 4/2013 | Brun | | G05B 15/02 703/1 |
| 2013/0103843 A1 * | 4/2013 | Rebbereh | | H04L 61/2038 709/227 |
| 2013/0110418 A1 * | 5/2013 | Nousiainen | | G01L 7/00 702/50 |
| 2013/0136019 A1 * | 5/2013 | Fujimoto | | H04W 24/02 370/252 |
| 2013/0208724 A1 * | 8/2013 | Colucci | | H04L 12/40169 370/392 |
| 2013/0282931 A1 * | 10/2013 | Petzen | | H04L 61/2038 710/9 |
| 2014/0081182 A1 * | 3/2014 | Klose | | A61B 5/0002 600/595 |
| 2014/0108685 A1 * | 4/2014 | Ismail | | G05B 19/0423 710/105 |
| 2014/0121785 A1 * | 5/2014 | Ismail | | H04L 12/40032 700/3 |
| 2014/0122855 A1 * | 5/2014 | Maneval | | G05B 19/0426 713/1 |
| 2014/0207255 A1 * | 7/2014 | Tandon | | G05B 19/0428 700/12 |
| 2014/0278139 A1 * | 9/2014 | Hong | | A61B 5/4866 702/19 |
| 2014/0280742 A1 * | 9/2014 | Raja | | H04L 67/2823 709/219 |
| 2014/0337550 A1 * | 11/2014 | Boeck | | G06F 13/4295 710/107 |
| 2014/0364970 A1 * | 12/2014 | Goli | | G06F 8/30 700/87 |
| 2014/0368291 A1 * | 12/2014 | Mochizuki | | H01P 1/20 333/33 |
| 2014/0369212 A1 * | 12/2014 | Raravi | | H04W 40/246 370/252 |
| 2015/0048684 A1 * | 2/2015 | Rooyakkers | | H04L 9/3263 307/65 |
| 2015/0054655 A1 * | 2/2015 | Bailey | | G08C 17/02 340/870.01 |
| 2015/0058432 A1 * | 2/2015 | Mizutani | | G05B 19/05 709/208 |
| 2015/0084747 A1 * | 3/2015 | McLaughlin | | G08C 17/02 340/12.5 |
| 2015/0106826 A1 * | 4/2015 | Hahniche | | H04L 41/0253 719/321 |
| 2015/0113423 A1 * | 4/2015 | Giango | | H04L 67/025 715/740 |
| 2015/0120688 A1 * | 4/2015 | Shionoiri | | G06F 17/30386 707/705 |
| 2015/0145654 A1 * | 5/2015 | Gunzert | | G08C 17/02 340/12.5 |
| 2015/0156805 A1 * | 6/2015 | Isenmann | | H04W 76/023 455/426.1 |
| 2015/0170653 A1 * | 6/2015 | Berndt | | G10L 15/22 704/275 |
| 2015/0173173 A1 * | 6/2015 | Ragg | | H05K 1/0212 361/736 |
| 2015/0244697 A1 * | 8/2015 | Siddesh | | G05B 19/0428 726/7 |
| 2015/0248122 A1 * | 9/2015 | Norwood | | G06Q 30/0621 700/87 |
| 2015/0278144 A1 * | 10/2015 | McLaughlin | | G06F 13/4027 710/104 |
| 2016/0018470 A1 * | 1/2016 | Shetty | | G01R 31/3606 324/426 |
| 2016/0085244 A1 * | 3/2016 | Jackson | | G05D 23/1919 137/2 |
| 2016/0100437 A1 * | 4/2016 | Armstrong | | H04W 4/023 370/249 |
| 2016/0116910 A1 * | 4/2016 | Lutz | | G05B 19/4185 700/19 |
| 2016/0132444 A1 * | 5/2016 | Jaraudias | | H04L 49/109 710/308 |
| 2016/0132538 A1 * | 5/2016 | Bliss | | G05B 19/41855 707/741 |
| 2016/0178683 A1 * | 6/2016 | Ramey | | G01R 31/025 324/538 |
| 2016/0182323 A1 * | 6/2016 | Ferguson | | H04L 43/062 709/224 |
| 2016/0203010 A1 * | 7/2016 | Azizian | | G06F 9/455 703/23 |
| 2016/0203344 A1 * | 7/2016 | Fink | | G06F 21/86 726/26 |
| 2016/0234956 A1 * | 8/2016 | Santi | | H05K 7/1408 |
| 2016/0241663 A1 * | 8/2016 | Wesselmann | | H04L 67/2861 |
| 2016/0267295 A1 * | 9/2016 | Gervais | | G06F 21/6245 |
| 2016/0284208 A1 * | 9/2016 | Pfenniger | | A61C 17/224 |
| 2016/0328029 A1 * | 11/2016 | March | | G06F 3/0346 |
| 2017/0045897 A1 * | 2/2017 | Pyotsia et al. | | F04B 51/00 |
| 2017/0293888 A1 * | 10/2017 | Shackelford | | G06Q 10/10 |

(56) References Cited

U.S. PATENT DOCUMENTS

2017/0300024 A1* 10/2017 Nixon ................ G05B 19/4186
2017/0346673 A1* 11/2017 Kneckt .................. H04L 29/12

FOREIGN PATENT DOCUMENTS

| DE | 10309886 A1 | 9/2003 |
| EP | 0913750 A1 | 5/1999 |
| EP | 1653306 A2 | 5/2006 |
| WO | WO 2014026759 A1 | 2/2014 |

* cited by examiner

INDEPENDENT AUTOMATION TECHNOLOGY FIELD DEVICE FOR REMOTE MONITORING

CROSS-REFERENCES TO RELATED APPLICATIONS

This application claims the priority of European Patent Application, Serial No. 15154671.0, filed Feb. 11, 2015, pursuant to 35 U.S.C. 119(a)-(d), the disclosure of which is incorporated herein by reference in its entirety as if fully set forth herein.

BACKGROUND OF THE INVENTION

The present invention relates to a method and apparatus for monitoring automation technology. More particularly, the present invention relates to providing continuous remote monitoring of automation technology.

The following discussion of related art is provided to assist the reader in understanding the advantages of the invention, and is not to be construed as an admission that this related art is prior art to this invention.

As automation technology continues to develop, the monitoring of automated processes from a distance is gaining ever greater importance. In particular, continuous monitoring of individual components and devices is increasingly frequently taking place in the field.

Various processes and devices are known that provide monitoring of this kind. It is known, for example, to detect the relevant variables being monitored using suitable sensors and to transfer the variables to an automation device or the like. However, this leads to a significant loading of the automation device's communication connection during that process. Furthermore, in general, the sensors, the real-time control hardware and typical programming languages, such as AWL, ST or HiGraph, used by the automation devices have only a limited capability for providing continuous monitoring. The more demanding types of technical evaluation, such as a Fourier analysis or production plan-related analyses, for example, are therefore not possible for the typical real-time control hardware used.

It is possible for the respective automation device to pass on the data recorded by the sensors to be processed by a higher-order device, that is, one on a higher level, such as the process control level for example, or for an additional automation device such as an industrial PC, etc., to undertake these evaluations. However, this procedure requires a complete transfer of data not previously processed, raw data, from the respective automation devices to another device, and even just this further communication of raw data produces a substantial additional load on the automation devices.

Theoretically it is conceivable that a further interface for direct monitoring of the process on the higher level could be implemented, in addition to the usual interface implemented for the automation devices. However, this procedure leads to increased complexity.

It would therefore be desirable and advantageous to address this problem and to obviate other prior art shortcomings.

SUMMARY OF THE INVENTION

Advantageously, the present invention provides efficient monitoring of processes from a distance in a simple, economical and reliable way. It also enables this monitoring without intervening in real-time-critical and/or safety-critical control domains of the processes. Thus, an open system is provided, one that captures and passes on process signals without intervention in the control system.

An automation field device in accordance with a presently preferred embodiment of the invention includes internal sensor apparatus that detects states to which the field device as a whole is subjected. Sensor signals are fed from an external sensor apparatus through connections to the field device. The field device includes a channel to a serial field bus, a further channel different from the channel to the serial field bus, and a processor that runs a program stored in a program memory. In accordance with the program, the processor receives signals transmitted via the field bus from the internal sensor apparatus and/or via the connections from the external sensor apparatus and/or via the channel to the field bus, and determines an evaluation result using the received signals. In accordance with the program, the processor either always transmits the evaluation result via the further channel to a higher-order apparatus or, alternatively, decides whether a transfer of the evaluation result to the higher-order apparatus is required using the evaluation result, and only if that transfer of the evaluation result is required, transmits the evaluation result via the further channel to the higher-order apparatus.

According to another advantageous feature of the present invention, the internal sensor apparatus can include an accelerometer, a vibration sensor, a temperature sensor and/or a position sensor. In one embodiment, the position sensor can be configured as a GPS module, for example.

The connections can be configured as digital connections for binary signals. Alternatively or additionally, the connections can be configured as connections for analog signals. In a particular embodiment, the analog signals carried by the analog connections are 4-20 mA current signals.

Advantageously, the field device can be pre-programmed, so that neither programming, nor parameterizing or the like are normally required from the final user. In one embodiment, because the final user need not program nor parameterize the field device, it has no operating panel. A further embodiment of the field device it has a connection for connecting a control panel. One particular example of this type is a line-bound connection, for example a USB connection or a line-free connection such as a Bluetooth interface, for example.

According to another advantageous feature of the present invention, the connections to the external sensor apparatus can be configured as individual connections. For example, the connections can be configured as screw terminals, as spring-loaded terminals or as insulation-piercing terminals. In particular, they are advantageously individual contacts rather than a prefabricated multipole plug-in connection.

The internal sensor apparatus, processor, program memory, channel to the field bus and the device's further channel can be typically arranged on a main circuit board. It is possible that the connections are arranged on an auxiliary circuit board and that the auxiliary circuit board is plugged onto the main circuit board by means of a multipole plug-in connection. In this embodiment, in particular, the type of connections provided can be varied by selecting a correspondingly configured auxiliary circuit board, as needed.

According to another advantageous feature of the present invention, the channel to the field bus can be a wired channel. For example, the channel to the field bus can operate using ETHERNET protocols. Alternatively, this channel to the field bus can be a wireless channel that uses the WLAN, Bluetooth or mobile radio (GSM, UTMS or the like) wireless connection communication protocols. Although the configuration of the further channel is independent of the configuration of the channel to the field bus, it can also be configured to use one of these protocols.

According to another advantageous feature of the present invention, the processor can be configured as a "universal" or general purpose processor, programmed in a high-level language such as Fortran or C++ so that the configuration of configured the evaluation provided by the processor can be very flexible. For example, the evaluation may use filtration, FFT, averaging, limit-value monitoring, and other well-known evaluation methods. Evaluation by the processor of the field device can take place in real time, or can be decoupled from the real-time context of the control system. Furthermore, the evaluation is entirely independent of the control of the technical process provided by the automation device controlling the technical process.

The protocol by which the further channel transmits the evaluation result from the processor can also be specified. In particular, this processor can use a protocol for the further channel that is different from the protocol of the channel that sent the signals that the processor receives to the field bus.

According to another advantageous feature of the present invention, the channel to the field bus can be a prefabricated bus cable, and energy can be supplied to the field device via the bus cable.

In principle, it is possible to transmit target values for the controlled process to the field device via the further channel. In this case, the processor of the field device transmits the target values via the field bus. The target values transmitted via the field bus are received and utilized by a controller of the process. Advantageously, however, the processor does not output any signals to the field bus via the channel to the field bus. Advantageously, this applies regardless of whether or not the processor receives any signals at all via the channel to the field bus. The possibility that the processor receives no signals via the channel to the field bus exists because it is possible that the processor receives signals exclusively from the internal sensor apparatus and/or via the connections from the external sensor apparatus, in particular.

As mentioned above, it is possible in principle to program the field device using a prefabricated interface, for example a USB connection, or a wireless connection, such as the access provided by a Bluetooth interface. Alternatively or additionally, it is possible to program the field device via the further channel. Advantageously, however, the processor exclusively transfers the evaluation result via the further channel to the higher-order apparatus, but does not receive data from the higher-order apparatus via the further channel. It is therefore not possible, in particular, to influence the behavior of the field device via the further channel. This can be advantageous for reasons of the operational safety of the field device and also for reasons of the operational safety of the technical process which is monitored by means of the field device.

Advantageously, the field device can be real-time capable to some degree. In particular, it is preferable for the processor to determine the evaluation result within a pre-determined reaction time after reception of signals from the internal sensor apparatus and/or from the external sensor apparatus and/or via the channel to the field bus. If the processor always transmits the evaluation result via the further channel to the higher-order apparatus, then the transmission of the evaluation result also takes place via the further channel to the higher-order apparatus within the pre-determined reaction time. If the processor decides that, depending on the evaluation result, a transfer of the evaluation result to the higher-order apparatus is required, only in this event does it transmit the evaluation result to the higher-order apparatus within the pre-determined reaction time. This decision also takes place and—if required—the transmission of the evaluation result also takes place via the further channel to the higher-order apparatus. The reaction time can be specified, if necessary. In a specific case, it can match the clock interval by which the monitored technical process is controlled. In general, however, the reaction time can be greater than such a clock time. The reaction time can be, for example, in the range of a few seconds to a few minutes.

The field device can be sufficiently protected against undesirable environmental influences. Advantageously, the field device has a housing that encapsulates the internal sensor apparatus, the processor and the program memory and may comply with type IP 20, IP 44, IP 54 or IP 65 protection standards. An even higher level of protection type may be useful in individual cases. Depending on the protection type, it can also be useful to arrange the connections for the external sensor apparatus, an energy supply and a cable connection for the channel to the field bus and/or the further channel and possibly also further connections to be encapsulated within the housing.

According to another advantageous feature of the present invention, at least the processor, the program memory and the channels can be arranged on a single circuit board or on a single chip. Thus the field device is advantageously configured as an SBC (Single Board Computer) or as a SoC (System on Chip). Such single board computers and systems on chip are commonly known and familiar to persons skilled in the art.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
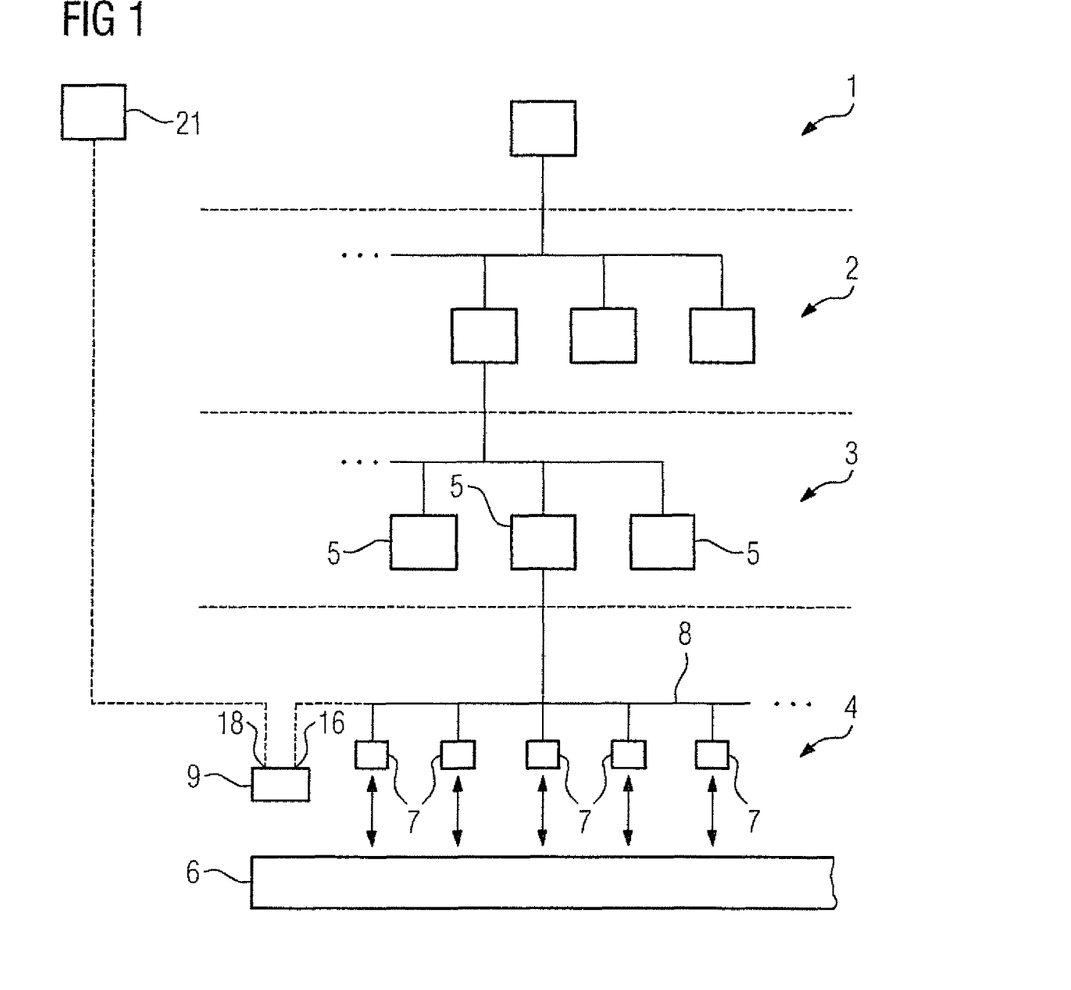
FIG. 1 shows an automation system having a field device according to the invention.

Turning now to the drawing, and in particular to FIG. 1, there is shown an automation system according to the invention, having a plurality of levels. In particular, the automation system has an administration level 1, a command level 2, an automation level 3 and a field level 4. In the context of the present invention, what is of interest is the field level 4 and partially also the automation level 3.

Automation devices 5 are arranged in the automation level 3. Each respective automation device 5 receives input signals from a controlled technical process 6 and determines control signals for the controlled technical process 6 using the input signals and the internal states of the respective automation device 5. The automation device 5 outputs the control signals to the controlled technical process 6. At least a part of the input signals and/or the control signals output by the automation device 5 are received by field devices 7 that are coupled to the controlled technical process 6 and communicate with the respective automation device 5 using a field bus 8. The field bus 8 is typically configured as a serial bus automation device 5, one using a PROFIBUS or as a CAN bus protocol for example.

The previously described field devices 7 are normal, conventional field devices, as are also known in the prior art. The description of the invention below only refers to these field devices 7 when explicit reference is made to these field devices 7. Regardless of whether the field devices 7 are present or not, however, a field device 9 according to the invention of the automation technology is present. This field device 9 is described in greater detail below.

Figure 2:
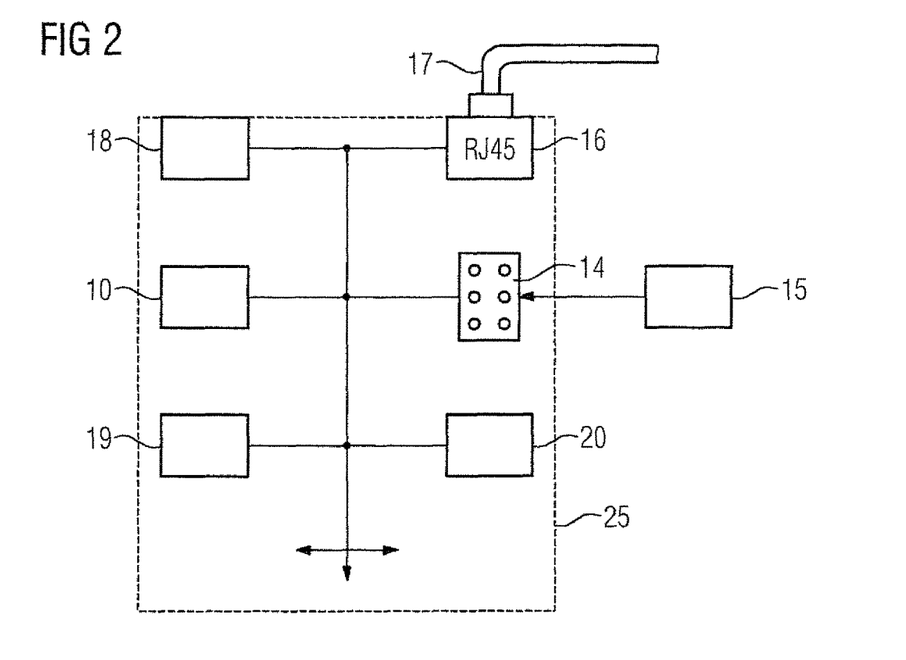
FIG. 2 is a block circuit diagram of a field device according to the invention.
Figure 3:
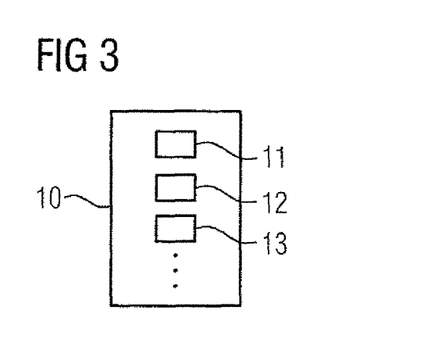
FIG. 3 shows an internal sensor apparatus.

According to FIG. 2, the field device 9 according to the invention includes an internal sensor apparatus 10 that detects states to which the field device 9 as a whole is subject. As shown in FIG. 3, these internal sensors 10 may comprise an accelerometer 11, a temperature sensor 12 and/or a position sensor 13. In addition, further sensors may be present, a vibration sensor, for example. The position sensor 13 may be configured as a GPS module or the like, for example.

Figure 4:
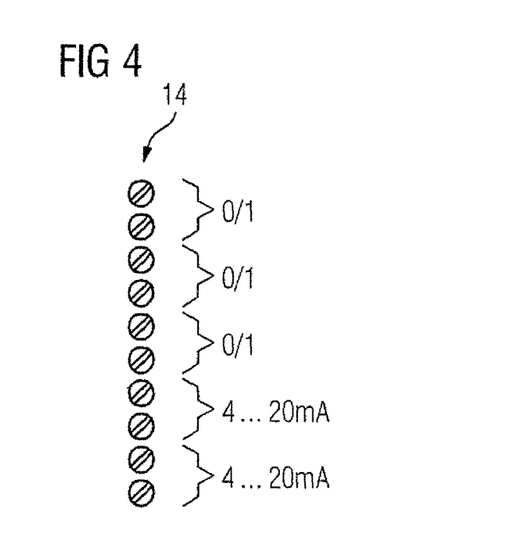
FIG. 4 illustrates the connections of an external sensor apparatus.

In FIG. 2, the field device 9 further includes connections 14 by which sensor signals can be fed to the field device 9 from the external sensor apparatus 15. The connections 14 may be configured as connections for binary signals. These binary signals can be produced by TTL logic or another type of logic, ECL or IIL for example. Alternatively, the connections 14 can be configured as connections for analog signals. The analog signals can be configured, far example, as 4-20 mA signals. Mixed forms are also possible. For example, in FIG. 4, the upper connections are configured as connections for binary signals and the lower connections are configured for analog signals.

In FIG. 1, the field device 9 also has a channel 16 to the field bus 8. The channel 16 to the field bus 8 may use the ETHERNET protocol or be a WLAN or mobile radio channel. If the channel 16 shown in FIG. 2 is a wired channel, the channel 16 may be carried by a prefabricated bus cable 17 such as the one that is labeled using the typical abbreviation RJ45. In the case of a wired channel, particularly when the channel 16 to the field bus 8 is configured as a prefabricated connection for the bus cable 17, energy may be supplied to the field device 9 by the bus cable 17.

According to FIG. 2, the field device 9 also has a further channel 18. The further channel 18 is a channel 18 which is different from the channel 16 to the field bus 8. The above description regarding the configuration of the channel 16 is valid in a similar way also for the configuration of the channel 18. The configuration of the channel 18 can be the same as the configuration of the channel 16 or different from the configuration of the channel 16, as necessary.

Finally, the field device 9 includes a processor 19. The processor 19 runs a program which is stored in a program memory 20 of the field device 9. The program stipulates the functional method of the field device 9. In particular, the program stipulates whether and from which of the components internal sensor apparatus 10, connections 14 to the external sensor apparatus 15 and channel 16 to the field bus 8, the processor 19 receives signals and how the processor 19 processes and evaluates these signals. It is possible that the processor 9 receives signals from all three components 10, 14 and 16. However, the processor 19 receives signals from at least one of the three components 10, 14 and 16. This will now be described in greater detail with reference to FIG. 5.

Figure 5:
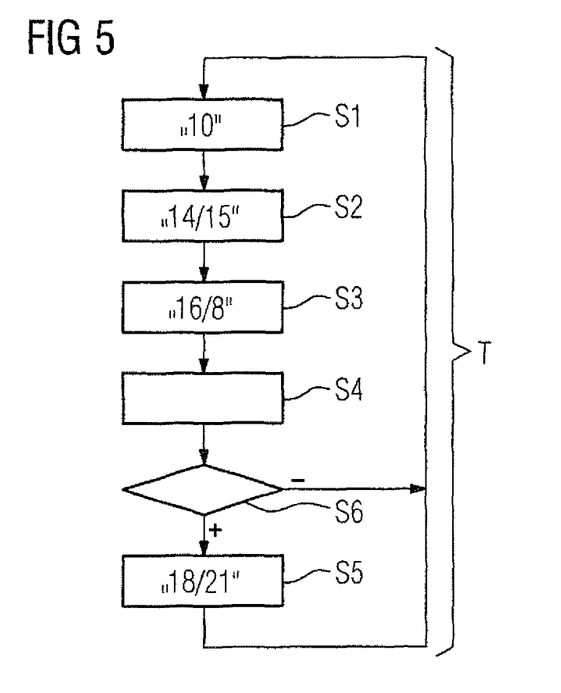
FIG. 5 is a flow diagram of a method in accordance with the invention.

According to FIG. 5, in a step S1, the processor 19 receives from the internal sensor apparatus 10, the sensor signals thereof. These sensor signals are—naturally—restricted to those sensor signals which can be made available by the internal sensor apparatus 10.

Furthermore, in a step S2, the processor 19 receives via the connections 14 from the external sensor apparatus 15, the sensor signals thereof. These signals can be specified according to need since the configuration of the external sensor apparatus 15 by the field device 9 is restricted only to the extent that the sensor signals output by the external sensor apparatus 15 must be compatible with the signals transmissible via the connections 14, that is they must be an analog signal in the range between 4 mA and 20 mA, for example. Which characteristic physical variable or circumstance the respective sensor signal output by the external sensor apparatus 15 represent, however, is not limited thereby. For example, it may represent a rotary speed, a temperature, a position, a pressure, etc. It may also be a variable that is characteristic of a mechanical vibration: its amplitude, frequency or direction, for example.

Furthermore, in step S3, via the channel 16 to the field bus 8, the processor 19 receives signals transmitted via the field bus 8. These signals may be, for example, input signals which are transmitted by one of the other, conventional field devices 7 to the respective automation device 5. Alternatively or additionally, these may be, for example, control signals which are transmitted by the respective automation device 5 to one of the other, conventional field devices 7.

The processor 19 carries out the steps S1 to S3 based on the running of the program stored in the program memory 20. According to the program, it is possible that all the steps S1 to S3 are present, only two of the steps S1 to S3 are present or only one of the steps S1 to S3 is present. However, at least one of the steps S1 to S3 is present.

In step S4, the processor 19 determines an evaluation result, based on the running of the program stored in the program memory 20, depending on the signals received. For example, in relation to sensor signals transmitted by the internal sensor apparatus 10 and/or the external sensor apparatus 15, the processor 19 can—according to its programming by the program—carry out averaging, a trend analysis, limit-value monitoring, a simple transformation or complex transformations such as are required for a Fourier analysis and other evaluations. Combinations of these measures are also possible. The processor 19 can also—as previously, according to its programming by the program—undertake filtration with regard to particular signals, depending on the signals transmitted via the field bus 8. For example, the processor 19 can filter out exclusively those signals which are transmitted by a particular one of the other conventional field devices 7 to the respective automation device 5. Building on the filtration, for example, similarly to the sensor signals, averaging, trend analysis, limit-value monitoring, a Fourier transform or other processing and evaluation can—but does not have to—be carried out.

In step S5, the processor 19 transmits the evaluation result via the further channel 18 to a higher-order apparatus 21 (see FIG. 1). The higher-order apparatus 21 is typically an off-line device, not linked into the direct, real-time steering and control of the technical process 6. This is however not precluded. In the typical case, however, only off-line monitoring of the technical process 6 takes place.

As far as previously described, the processor 19 always transmits the evaluation result to the higher-order apparatus 21. It is possible, however, according to the representation in FIG. 5, that a step S6 precedes the step S5. If step S6 is present, the processor 19 decides in step S6 whether a transmission of the evaluation result to the higher-order apparatus 21 is required. In this event, step S5 is only carried out if a transmission of the evaluation result to the higher-order apparatus 21 is required. In the case of a limit-value monitoring, for example, a transmission is limited to cases in which a pre-determined limit value is exceeded. In the case of a filtration to particular signals transmitted via the field bus 8, transmission of the evaluation result can be restricted to those cases in which the filtration has shown that a signal of this type has been transmitted via the field bus 8. In addition, under some circumstances, independently of the actual evaluation result, from time to time—for example, every minute or every hour—a sign of life can be transmitted by the processor 19 via the further channel 18 to the higher-order apparatus 21. For this purpose, the field device 9 can have an internal clock (not shown in the drawings).

Advantageously, the sequence of steps S1 to S5—possibly including step S6—is carried out repeatedly with a cycle time T. If step S6 is not present, it is ensured by this circumstance that the processor 19 determines the evaluation result within a pre-determined reaction time after the receipt of the signals from the internal sensor apparatus 10 and/or from the external sensor apparatus 15 and/or via the channel 16 to the field bus 8 and transmits said result via the further channel 18 to the higher-order apparatus 21. If step S6 is present, it is ensured by this circumstance that the processor 19 determines the evaluation result within a pre-determined reaction time after the receipt of the signals from the internal sensor apparatus 10 and/or from the external sensor apparatus 15 and/or via the channel 16 to the field bus 8, depending on the evaluation result, decides whether the transmission of the evaluation result to the higher-order apparatus 21 is required and, in that event, transmits the evaluation result via the further channel 18 to the higher-order apparatus 21.

Furthermore, in addition to the steps S1 to S5, further steps not shown in the drawings can also be present. For example, it is possible that the processor 19 outputs signals via the channel 16 to the field bus 8. For example—particularly after a suitable stipulation via the further channel 18—new target values or changes to the program of the automation device 5 can be output to the field bus 8. Advantageously, however, no such output of signals to the field bus 8 takes place. Insofar as the field bus 8 or the technical process 6 is concerned, the field device 9 is thus advantageously exclusively a listener which listens to the data traffic on the field bus 8. By means of this configuration, it is precluded in particular that access could be gained in an undesirable manner from outside—i.e. by hacking—to the control system of the technical process 6.

In a similar way, it is possible that the processor 19 receives data via the further channel 18 from the higher-order apparatus 21. For example, remote programming can take place, so that the program stored in the program memory 20 is amended. Also, target values and the like for the automation device 5—see the description above—can be transmitted to the field device 9. Advantageously, however, the processor 19 exclusively transmits the evaluation result via the further channel 18 to the higher-order apparatus 21. On the other hand, the processor 19 does not receive data via the further channel from the higher-order apparatus 21. As far as the further channel 18 is concerned, the field device 9 is thus Advantageously exclusively a transmitter which outputs but does not receive data via the further channel 18. By means of this configuration also, it is precluded in particular that access could be gained in an undesirable manner from outside to the control system of the technical process 6. If, nevertheless exceptionally, the processor 19 receives data for the technical process 6, however, the processor 19 advantageously always transfers these data to the automation device 5 via the channel 16 to the field bus 8, but not directly to one of the other conventional field devices 7.

The data traffic on the field bus 8 takes place according to a pre-determined protocol, for example, the PROFIBUS protocol. Accordingly, the processor 19 receives the signals transmitted via the field bus 8 in this protocol also. The transmission of the evaluation result via the further channel 18 to the higher-order apparatus 21 also takes place in a protocol. However, this protocol can be a different protocol than the protocol of the field bus 8. This is also typically the case. This is however not necessarily required.

The connections 14 for the external sensor apparatus 15 can be configured according to need. In particular, the connections 14 can be configured according to the schematic representation in FIG. 4, for example, as screw terminals. Other embodiments as single connections are, however, also possible, for example, as cage spring terminals, (individual) plug-in connections and the like.

Figure 6:
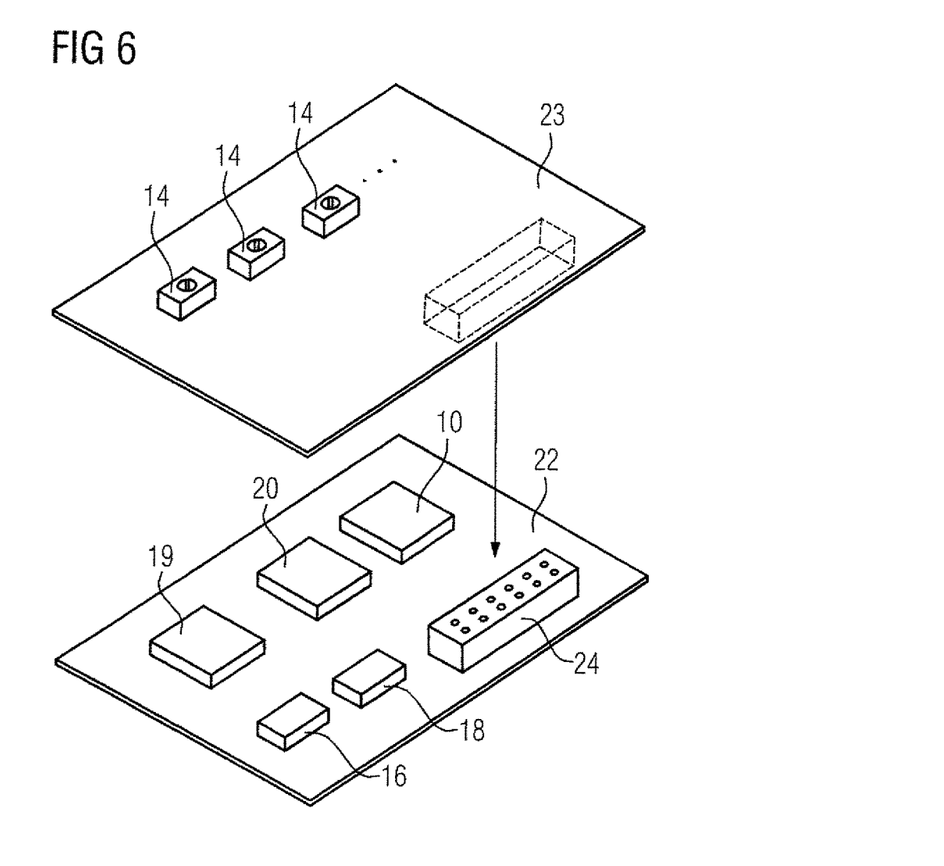
FIG. 6 is a perspective view of two circuit boards.
Figure 7:
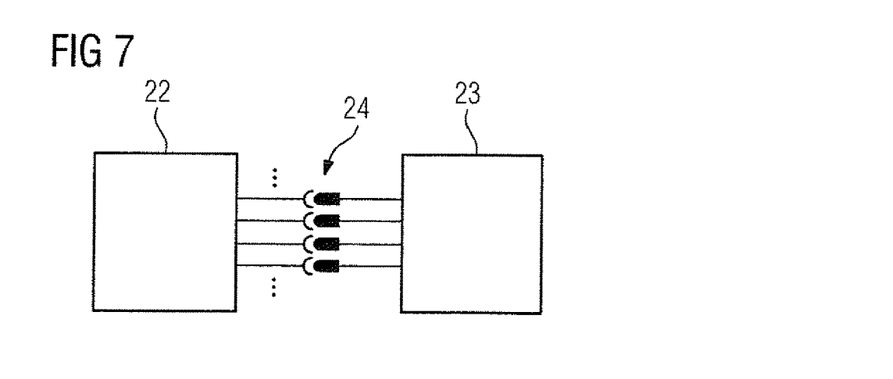
FIG. 7 is a block diagram of a circuit associated with FIG. 6.

The internal sensor apparatus 10, the processor 19, the program memory 20, the channel 16 to the field bus 8 and the further channels 18 are advantageously arranged according to the representation in FIG. 6 on a single circuit board 22 (main circuit board 22) (SBC=single board computer). They can even be arranged within the main circuit board 22 on a separate chip (SoC=system on chip). A particularly flexible embodiment of the field device 9 is produced in that the connections 14 to the external sensor apparatus 15 are not arranged on the main circuit board 22 but on an auxiliary circuit board 23. In this case, the auxiliary circuit board 23 can be plugged via a multipole plug connection 24 onto the main circuit board 22 according to the representation of FIGS. 6 and 7. By changing the auxiliary circuit board 23, without further modification of the field device 9, the choice of connections 14 can be varied as needed.

After the program is stored in the program memory 20, no further direct input by a person is required, as far as the field device 9 is concerned. It is therefore possible, and even preferable, that the field device 9 would have no operating panel. For this reason, an operating panel is also not shown in FIG. 2. When determining the tasks to be carried out by the field device 9, it is also advantageous for the processor 19 to be configured as a universal processor (a general-purpose processor). Processors of this type are generally known, for example the processors of the series ARM 11 or ARM CORTEX, and the like.

As shown in FIG. 2, the field device 9 has a housing 25. By means of the housing 25 which protects at least the internal sensor apparatus 10, the processor 19 and the program memory 20 by encapsulation. When necessary, the connections 14 for the external sensor apparatus 15 can also be arranged within the housing 25. Provided that the channel 16 to the field bus 8 and/or the channel 18 to the higher-order apparatus 21 are wired channels, the connections for the corresponding bus cables 17 can be arranged within the housing 25. The field device 9 may have an independent energy supply, such as a battery or an accumulator, and the independent energy supply may be supported by a solar cell or the like, for example.

Alternatively, a connection for an energy supply may be provided. This connection may be arranged within the housing 25. The encapsulation can comply with protection types IP 20, IP 44, IP 54, or IP 65, for example. A still higher protection type may be useful in individual cases. By means of the housing 25 or a fastening of the housing 25, if needed, protection against heat and/or vibration or other environmental influences such as chemically aggressive substances or radioactivity, alpha and beta radiation in particular, can also be realized. the housing 25 may have passages for lines and cables, If required. The housing 25 also may be small, having a size of 10 cm×10 cm×5 cm or less, for example.

In general, the invention provides a field device 9 having internal sensor apparatus 10 that detects states to which the field device 9 as a whole is subjected. It also has connections 14 that feed sensor signals from external sensor apparatus 15 to the field device 9. The field device 9 further includes a channel 16 to a serial field bus 8 and also has a further channel 18. The field device 9 includes a processor 19. For executing a program stored in the program memory 20. In accordance with that program, the processor 19 receives signals transmitted via the field bus 8 from the internal sensor apparatus 10 and/or via the connections 14 from the external sensor apparatus 15 and/or via the channel 16 to the field bus 8, and determines an evaluation result depending on the received signals. The processor 19 transmits the evaluation result, using the further channel 18, to a higher-order apparatus 21. If required, the processor 19 decides in advance, depending on the evaluation result, whether transmission of the evaluation result is required.

The present invention has many advantages. In particular, the monitoring of technical processes can be achieved at a high level in a simple, low cost and reliable manner without intervention in the real-time-bound control of the technical process 6. In order to realize such monitoring, a suitably programmed standardized field device 9 that is close to the technical process 6 to be monitored is required. Relevant external sensor apparatus 15 must also be provided, as needed. Additional measures are not necessary. The further channel 18 provides direct transmission of the evaluation result to the higher-order apparatus 21, circumventing the corresponding automation device 5. The field device 9 also has a very low degree of complexity in accordance with the invention, but has a universal applicability so that it can be produced and used economically in many monitoring applications.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. Apparatus for securely and reliably remotely monitoring industrial process control automation using a field device, said field device comprising:
   a processor configured to execute a computer program that is stored in a program memory in non-volatile machine-readable code;
   an input channel to the processor from a serial field bus providing input from internal sensor apparatus configured to detect states to which the field device as a whole is subjected;
   input connections configured to feed sensor signals from external sensor apparatus configured to monitor the automated industrial process to the processor; and
   a further channel configured to transmit data from the processor to an off-line higher-order apparatus, said computer program including a routine that determines an evaluation result on-line using the received signals and whether the evaluation result requires further evaluation, and that transmits an evaluation result that requires further evaluation via the further channel to a higher-order apparatus that is off-line.

2. The field device of claim 1, wherein the internal sensor apparatus comprises an accelerometer, a vibration sensor, a temperature sensor and/or a position sensor.

3. The field device of claim 1, wherein the connections are configured as connections for binary signals and/or analog signals.

4. The field device of claim 1, wherein the field device has no operating panel.

5. The field device of claim 1, wherein the connections for the external sensor apparatus are configured as single connections.

6. The field device of claim 1, wherein the internal sensor apparatus, the processor, the program memory, the channel to the processor from the field bus and the further channel are arranged on a main circuit board, that the input connections are arranged on an auxiliary circuit board and that the auxiliary circuit board is plugged into the main circuit board via a multipole plug connection.

7. The field device of claim 1, wherein the channel to the processor from the field bus and/or the further channel operate, for example, with ETHERNET physics or on the basis of WLAN or mobile radio.

8. The field device of claim 1, wherein the processor is configured as a universal processor.

9. The field device of claim 1, wherein the processor transmits the evaluation result from the processor to the off-line higher-order apparatus via the further channel using a protocol different from that with which it receives signals via the channel from the field bus.

10. The field device of claim 1, wherein the channel to the processor from the field bus is configured as a prefabricated connection for a bus cable and energy is supplied to the field device by the bus cable.

11. The field device of claim 1, wherein the processor outputs no signals to the field bus.

12. The field device of claim 1, wherein the processor transmits the evaluation result via the further channel to the higher-order apparatus, but does not receive data via the further channel from the higher-order apparatus.

13. The field device of claim 1, wherein the processor determines the evaluation result within a pre-determined reaction time after the receipt of the signals from the internal sensor apparatus and/or from the external sensor apparatus and/or via the channel from the field bus and either transmits the evaluation result via the further channel to the higher-order apparatus or, depending on the evaluation result, decides whether the transmission of the evaluation result to the higher-order apparatus is required and transmits the evaluation result via the further channel to the higher-order apparatus, if transmission is required.

14. The field device of claim 1, wherein the field device has a housing configured to encapsulate at least the internal sensor apparatus, the processor and the program memory.

15. The field device of claim 1, wherein at least the processor, the program memory and the channels are arranged on a single circuit board or on a single chip.

16. A method for secure and reliable continuous remote monitoring industrial process control automation using a field device having a processor configured to execute a computer program that is stored in a program memory in non-volatile machine-readable code, an input channel from a serial field bus providing input to the processor from internal sensor apparatus adapted to detect states to which the field device as a whole is subjected, input connections configured to feed sensor signals from external sensor apparatus to the processor, an input channel to the processor from a serial field bus, and a further channel that is different from the input channel to the processor from the serial field bus, said method comprising the steps of:
  receiving signals through the input channel to the processor and the serial field bus from the internal sensor apparatus and/or through the input connections from the external sensor apparatus,
  determining an evaluation result on-line, using the received signals,
  determining whether the evaluation result requires further evaluation, and
  transmitting an evaluation result via the further channel to a higher-order apparatus that is off-line, when the evaluation result requires further evaluation.

17. The method of claim 16 wherein the evaluation result is always transmitted via the further channel to the higher-order apparatus.

18. The apparatus of claim 1 wherein the evaluation result is always transmitted via the further channel to the higher-order apparatus.

19. The apparatus of claim 1 wherein said computer program includes a routine that determines whether transmission of the evaluation result to the higher-order apparatus is required, depending on the evaluation result, and transmits the evaluation result to the off-line higher-order apparatus only if required.

* * * * *

UNITED STATES PATENT AND TRADEMARK OFFICE
CERTIFICATE OF CORRECTION

PATENT NO. : 10,274,912 B2
APPLICATION NO. : 15/040675
DATED : April 30, 2019
INVENTOR(S) : Thomas Menzel Page 1 of 1

It is certified that error appears in the above-identified patent and that said Letters Patent is hereby corrected as shown below:

On the Title Page

Under [73] Assignee: correct the assignee to read --Siemens Aktiengesellschaft--.

Under FOREIGN PATENT DOCUMENTS, correct the second listed document to read --CN 102768512--.

Signed and Sealed this
Second Day of July, 2019

Andrei Iancu
*Director of the United States Patent and Trademark Office*